Oct. 24, 1967  N. E. ENGBORG  3,348,408
REFERENCE SOURCE FOR CALIBRATION OF THERMOGRAPHIC INSTRUMENTS
Filed April 1, 1965
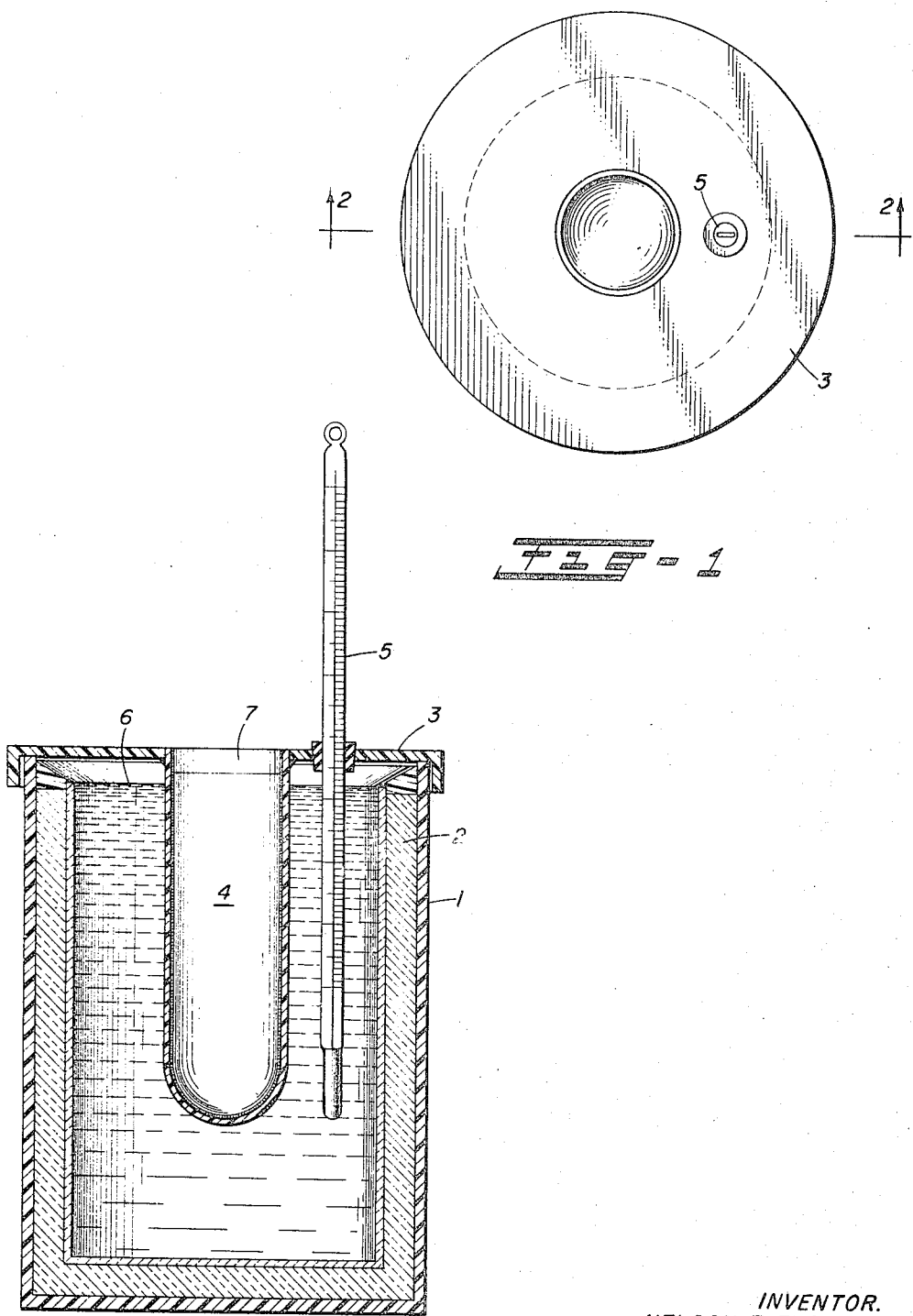
INVENTOR.
NELSON E. ENGBORG
BY
ATTORNEY 8,348,408
REFERENCE SOURCE FOR CALIBRATION OF
THERMOGRAPHIC INSTRUMENTS
Nelson E. Engborg, Old Greenwich, Conn., assignor to Barnes Engineering Company, Stamford, Conn., a corporation of Delaware
Filed Apr. 1, 1965, Ser. No. 444,731
6 Claims. (Cl. 73—1)

ABSTRACT OF THE DISCLOSURE

A black body source in the form of a closed-end tube in a cover is mounted on an insulated container for a liquid, the closed-end tube projecting into the liquid, and an accurate temperature measuring device, such as a precision thermometer, also extending through the cover. The inner surface of the closed-end tube projecting into the liquid is of relatively high emissivity, and if desired, a narrow mirror band at the tube where it enters the cover may be provided. The container is filled with a liquid at calibrating temperature, and as soon as the closed-end tube has reached temperature equilibrium, it constitutes a black body radiation source at the temperature of the surrounding liquid.

Background of the invention

Thermography has achieved marked success both in general fields and for medical diagnosis, in the latter case the temperature of a patient's skin is measured. In all infrared instruments certain reference radiation sources are required either for continuous or occasional calibration or comparison. In the past certain black body cavities were used, that is to say conical cavities, with blackened surfaces and of extent sufficient so that the multiple reflections produce radiation as if from a black body source of perfect emissivity. These black body cavities are usually maintained at a definite temperature by means of electrical heaters. Often the temperature is automatically controlled by a temperature sensitive element which varies the amount of heating. Black body reference sources may be used either in a thermographic instrument itself for continuous comparison with radiation received from an object to be thermographed or for calibration of infrared radiometers or similar instruments from time to time.

The temperature controlled black body sources operate perfectly but they have certain drawbacks. They are relatively expensive, a source of electric power is needed and the power consumption is fairly heavy, often as much or more as the power consumption for the rest of the thermographic instrument. There is, therefore, a need for a cheap and accurate black body source which does not require electrical heating.

Summary of the invention

The source is useful for calibration and is normally not built into a thermographic instrument. In the more specific description to follow, the reference source of the present invention will be described in conjunction with a medical thermograph in other words to produce radiations from temperatures ranging from about 70° F. to somewhat over 100° F. The invention is not limited to use with such instruments as will appear from further description.

Calibration is required in the case, particularly of a medical thermograph, either for direct observation by the instrument or to calibrate auxiliary radiation sources at predetermined temperatures which can be used to produce a gray scale on the final thermogram. The reference source of the present invention is useful for either type of calibration or for any other calibration which requires an accurate reference source.

Reference has been made to thermographs and while the present invention is not in any sense limited to any particular design or thermograph, it is particularly useful with thermographs such as those described in the patents to Astheimer, 2,895,049, and Barnes, Banca and Engborg, 3,169,189. In this type of thermograph an infrared detector is scanned across the surface to be thermographed, the electrical output from the detector amplified and used to modulate a glow tube and the light from the glow tube is scanned in synchronism over a photographic surface. This type of thermograph produces a thermogram which resembles a television raster, although usually with somewhat fewer lines.

Brief description of the drawings

FIG. 1 is a plan view of the top of the reference source, and

FIG. 2 is a vertical section along the line 2—2 of FIG. 1.

Description of the preferred embodiment

The reference source consists of a chamber 1 with an insulating lining 2 which is impervious to a liquid to be filled into the chamber. For medical thermography the liquid will usually be water but the invention is not limited thereto and for temperatures for which water is not suitable other liquids may be used. The level of the liquid is shown in FIG. 2 by a line 6 and will normally be near or at the top of the chamber. The exact level is not critical and this is an operating advantage of the present invention.

The source is provided with a rigid cover 2, preferably of plastic, where the temperatures are such as to permit the use of this type of material. In the center of the cover there is mounted, or if desired molded in, a closed end tube 4 which for medical thermography is also preferably of plastic. The nature of the material is not important but plastic has the advantage that it does not break readily as does glass.

The inside of the tube 4 is blackened although in the case of dark plastics this is not absolutely essential because the multiple reflections in the tube will make it appear to be a black body source. There may be, if desired, a narrow band at the top of the tube shown at 7 which has a high infrared reflectance. Through another opening in the cover 3 a sensitive and accurate thermometer extends into the chamber when the cover is placed thereon. The operation of the reference source will be described in conjunction with a medical thermograph or radiometer.

First the chamber is filled with water of the temperature desired for the reference source or very slightly above to compensate for slight cooling when the water is first poured into the insulated container. The container is swirled by hand to distribute the water uniformly and permit it to assume a uniform temperature. This is read by the thermometer 5 and the tube 4 assumes the water temperature. Therefore, the inside of the tube 4 becomes a black body source at the temperature of the water. A thermograph can be scanned across the top of the reference source and will show on the thermogram an image corresponding to the temperature of the source. It is also possible to scan the thermograph across and to note the reading of the glow tube current meter as the scan crosses the opening of the tube 4. It is, of course, a matter of choice and convenience how the reference source of the present invention is used.

For most calibrating surfaces the inside of the tube 4 may be blackened all the way to the tube but if desired a band of high reflectivity 7 may be present at the point above the level of the water. This minimizes any false readings resulting from the sides of the tube above the water layer which may not be exactly at the temperature of the water. For most uses this added refinement is not necessary.

If it is desired to calibrate at a series of temperatures the water can initially be at the highest temperature desired and permitted to cool down or other temperature points can be obtained by additions of small amounts of cold water. In each case the reference source should be swirled after adding further amounts of water to insure uniform water temperature.

The reference source of the present invention can also be used for calibrating radiometers. These are often hand held instruments with a projecting cone the inside of which is a mirror and constitutes focusing optics. In such a case the end of the cone may be inserted some distance into the tube 4 and will, therefore, see only the walls of the tube which are at water temperature. In such a case the refinement of a mirror band at the top of the tube 4 may not be necessary but, of course, does no harm.

If the reference source of the present invention is to be used to calibrate an external gray scale for a thermograph the thermograph is scanned across the gray scale and across the reference source the temperature of which is set for one of the gray scale gradations, for example the hottest one. The thermogram can then be read, if necessary on a densitometer, and it can be determined whether the particular gray scale generating surface is at the temperature desired. If not, the temperature of the gray scale can be adjusted by adjusting the electrical heating of the gray scales which is normally present. The calibration can be repeated at different temperatures corresponding to those desired for other gradations on the gray scale. Gray scales are often made so that the surfaces bear definite temperature relations to each other and it is then necessary only to calibrate one of them.

If it is desired to use the source of the present invention for other temperatures, different liquids may be used such as, for example, high boiling oils and the like. Of course, the insulation 2, the tube 4 and the range of the thermometer 5 must be chosen to correspond to the temperatures which are to be present in the source.

While the invention is not limited to any particular material for the projecting tube 4 plastics have an advantage where the temperature and other characteristics of the liquid to be used is compatible with them. The plastics have very low heat conductivity and, therefore, after a very short time for the tube to acquire the temperature of the surrounding liquids there is no measurable vertical temperature gradient. When metal tubes are used a vertical temperature gradient is sometimes noted unless the liquid is agitated and, therefore, the projecting tubes of plastic constitute the preferred embodiment of the invention.

I claim:
1. A reference black body source for infrared instruments comprising in combination,
 (a) a liquid-tight open-top container with insulated walls filled with a liquid at calibrating temperature,
 (b) a cover for closing the top of said container, said cover having an opening with a downwardly projecting closed end tube of cross section small in comparison with the cross section of the container, the inner surface of the tube being of high emissivity for at least the major portion of its length from the closed end, which projects into the center of the container, and
 (c) thermometric means for accurately measuring the temperature of any liquid introduced into the container.

2. A reference source according to claim 1 in which the temperature measuring element is a precision thermometer projecting through the cover into the interior of the container.

3. A reference source according to claim 2 in which the projecting tube is of plastic of low thermal conductivity.

4. A reference source according to claim 2 for use in medical thermographic instruments in which the insulating wall of the container is water proof and the cover and projecting tube are of plastic of low thermal conductivity.

5. A reference source according to claim 1 in which the projecting tube is of plastic of low thermal conductivity.

6. A reference source according to claim 5 in which the projecting tube is provided with a narrow annulus at its top of high reflecting power.

References Cited

UNITED STATES PATENTS

| 1,122,345 | 12/1914 | Wilbur | 73—361 |
| 2,963,910 | 12/1960 | Astheimer | 73—355 |
| 3,069,909 | 12/1962 | Hines | 73—361 |
| 3,138,697 | 6/1964 | Banca et al. | 250—84 X |

FOREIGN PATENTS

| 571,801 | 5/1924 | France. |

OTHER REFERENCES

McFee, Raymond H., Blackbody Source Unit With Electronic Temperature Control, in The Review of Scientific Temperature Instruments, vol. 23, No. 1, pp. 52–53. Copy in 73–361. Q 184 R5.

LOUIS R. PRINCE, *Primary Examiner.*

FREDERICK SHOON, *Assistant Examiner.*